United States Patent [19]

Gravett

[11] 3,993,325
[45] Nov. 23, 1976

[54] TRAILER COUPLING APPARATUS

[76] Inventor: Darrell E. Gravett, Rte. 2, Pleasantville, Iowa 50225

[22] Filed: Aug. 11, 1975

[21] Appl. No.: 603,697

[52] U.S. Cl. .......................... 280/415 B; 280/423 R
[51] Int. Cl.² .......................................... B60D 1/00
[58] Field of Search ........ 280/415 R, 415 A, 415 B, 280/402, 423 R, 432, 437, 438, 456 A, 460 A, 461 A

[56] References Cited
UNITED STATES PATENTS

| | | | |
|---|---|---|---|
| 2,673,747 | 3/1954 | Norris | 280/437 X |
| 3,198,549 | 8/1965 | Martin | 280/437 X |
| 3,266,817 | 8/1966 | Engstrom | 280/461 A |
| 3,580,611 | 5/1971 | McNitt | 280/433 |
| 3,731,951 | 5/1973 | Gruenberger | 280/461 A |
| 3,820,821 | 6/1974 | Leland | 280/415 B |

Primary Examiner—Robert R. Song
Assistant Examiner—John A. Pekar
Attorney, Agent, or Firm—Henderson, Strom & Sturm

[57] ABSTRACT

A standard automatic coupling apparatus for connecting a trailer to a prime mover, the coupling apparatus being of a type having a plate with a central slot disposed therein and having locking structure in the slot so that a pin connected to the trailer can be selectively locked into the slot. The plate is pivotally mounted alternatively to either a truck bed structure or to an agricultural tractor by means of novel structures.

6 Claims, 6 Drawing Figures

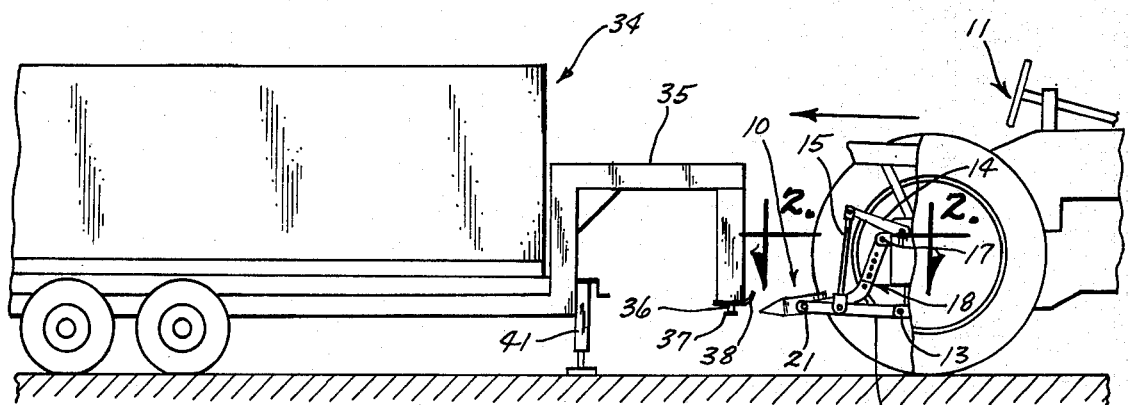
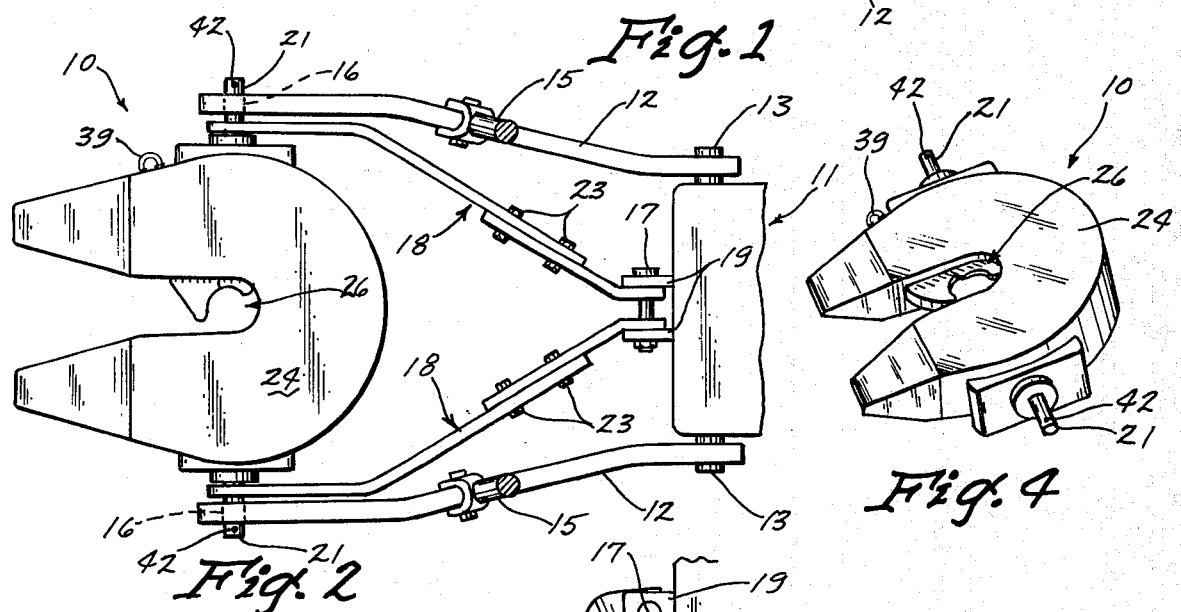
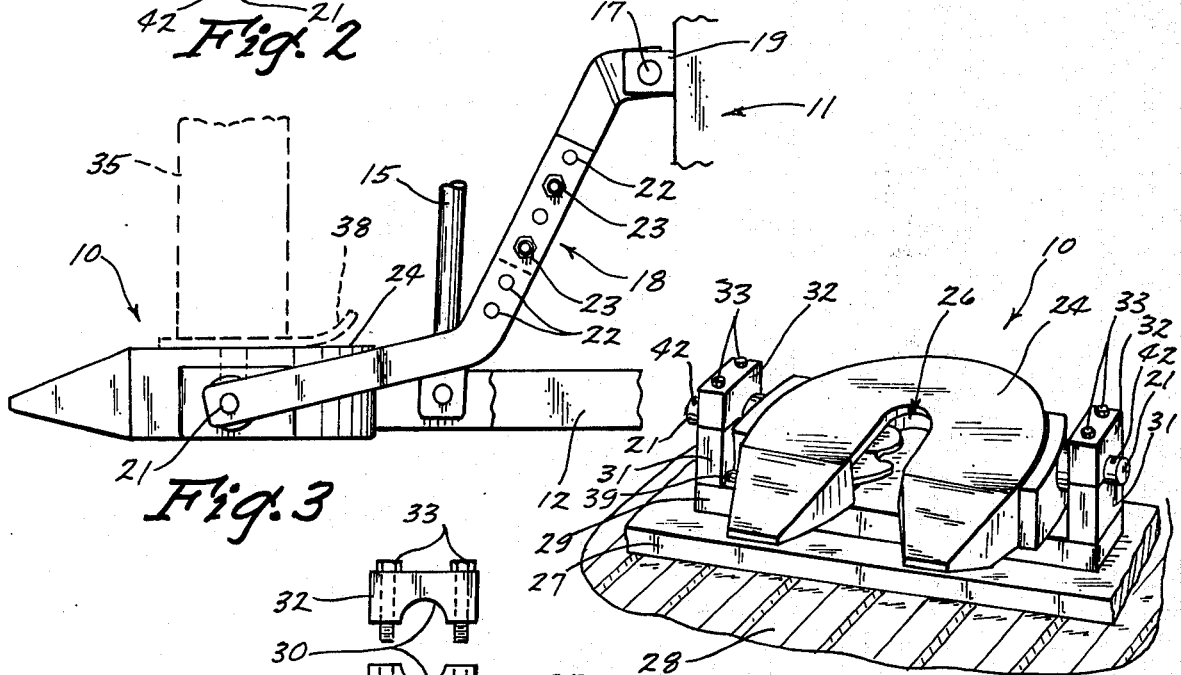
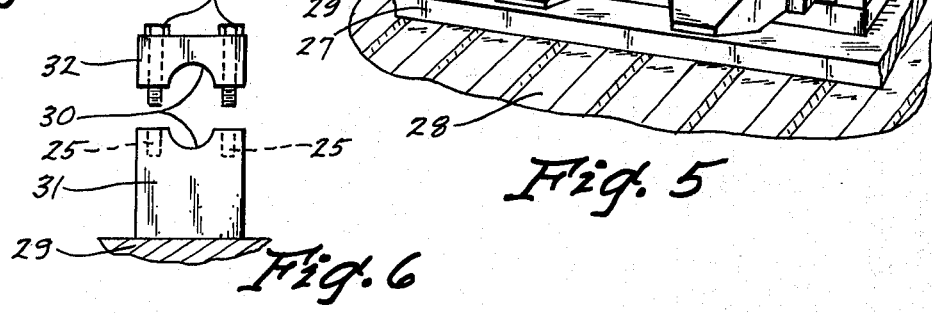

3,993,325

TRAILER COUPLING APPARATUS

BACKGROUND OF THE INVENTION

The present invention relates generally to trailer hitches and more particularly, to structures for adapting a trailer hitch to either a truck bed or an agricultural type tractor.

An increasingly popular type of trailer is the so-called "goose-neck" trailer which connects with a trailer hitch located in the bed of a truck rather than the normal type of trailer which connects to the rear end of a towing vehicle. One of the reasons for such an arrangement is to place the weight more centrally and above the wheels of the vehicle rather than rearwardly thereof. This arrangement allows for much better control over the trailer when it is being towed and consequently allows the trailer to be of a much bigger variety than could be accommodated by a normal rear end hitch arrangement. This popularized trailer hitch arrangement has been used for campers and for agricultural trailers, and it is to the agricultural type of trailer that this present invention is directed.

An agricultural trailer of the type referred to above is extremely versatile, and a truck which would have this same capacity would cost a great deal more. Furthermore, the upkeep on such a trailer would be much less. In a typical farming operation of a few years ago, the equipment would include nearly always a pick-up truck and also a grain truck which could additionally be used to transport livestock from place to place. With the use of the above described goose-neck type of trailer, only the smaller pick-up truck would be essential. Additionally, the license fees for using a trailer of this type would be much less than the license fee for a large truck of the same capacity. Consequently, it is because of the lower costs and its versatility that the goose-neck type of trailer has become so popular.

There are several alternatives as to the type of hitch to be used for this type of trailer, and the two types which are most commonly used are the ball-type hitch and the conventional semi-trailer truck type of hitch. Both types of hitches can, of course, be mounted to the bed of a pick-up truck. The ball-type of hitch is less bulky and would be preferable for that reason; but, the semi-trailer truck type of hitch, such as that shown in the drawings herein, is preferable because of its automatic hitching feature and also because it is safer. It is safer because of the large flat supporting surface which is used as contrasted from the small surface which is contacted with a ball-type hitch.

It would be desirable, of course, to be able to use the conventional semi-trailer type of hitch and to be able to remove it from the pick-up bed when other uses of the pick-up truck are contemplated. Also, it would be desirable to be able to also use an agricultural-type tractor to move the trailer from place to place, especially when the trailer is to be utilized for off road situations, such as when the trailer is used to unload grain from a grain harvesting combine in the field.

SUMMARY OF THE INVENTION

The present invention relates to a trailer hitching connection for installation alternatively on either a truck or an agricultural tractor so that a trailer can subsequently be connected thereto. An automatic coupling device is pivotally mounted to a truck bed by structure which makes it easily removable therefrom and structure is also provided to allow the mounting of such coupling device once removed from the truck bed to an agricultural tractor or vice versa.

An object of the present invention is to provide an automatic hitching coupling for use in the bed of a truck which is easily removable therefrom.

Another object of the invention is to provide a means for connecting an automatic hitch of the type commonly used in the bed of a pick-up truck for connection to the rear of an agricultural tractor.

Other objects, advantages, and novel features of the present invention will become apparent from the following detailed description when viewed in conjunction with the accompanying drawings.

BRIEF DESCRIPTION OF THE DRAWINGS

FIG. 1 is a side elevational view of the present invention connected to an agricultural tractor and shown in readiness for hitching to a trailer;

FIG. 2 is a top view of the present invention as connected to agricultural tractor and taken along line 2—2 of FIG. 1;

FIG. 3 is a partial side view of the connection structure of the hitch for use on an agricultural tractor;

FIG. 4 is a perspective view of the main part of the hitch arrangement to be connected to a prime mover for towing a trailer;

FIG. 5 is a perspective view of the present invention as connected to the bed of a truck; and FIG. 6 is an exploded view of the structure which makes the hitch removable from the bed of the truck as shown in FIG. 5.

DETAILED DESCRIPTION OF THE PREFERRED EMBODIMENT

Referring now to the drawings wherein like reference numerals designate identical or corresponding parts throughout the several views, FIG. 1 shows an automatic hitch plate 10 connected to a tractor 11. The tractor 11 has draft arms 12 pivotally connected thereto by the pins 13. The draft arms 12 are normally pivotable about the pins 13 by the action of the levers 14 and the links 15 which are, in turn, controlled by the tractor operator by hydraulic controls (not shown). The openings 16 form two points of what is commonly referred to as a three-point hitch arrangement, and the pin 17 is the third point of such three-point hitch arrangement. Rigid supporting members 18 have openings in each end thereof, the top holes thereof having the pin 17 received therethrough. The pin 17 also is received through the plates 19 which are rigidly attached to the tractor. The lower ends of the rigid members 18 have holes therein with pins 21 extending therethrough, when the hitch is connected to the tractor (FIG. 2). The pins 21 are also received through the openings 16 in the ends of the draft arms 12 as shown in FIG. 2. A pin 42 is then placed through pins 21 to prevent rigid members 18 and draft arms 12 from sliding off of the pins 21. The rigid members 18 are adjustable in length by virtue of the two-piece construction thereof and because of the plurality of openings 22 and the nut and bolt devices 23 extending therethrough. The function of the rigid members 18 is to prevent the draft arms 12 from moving from the desired level for the specific trailing vehicle to be used. In other words, this arrangement causes the draft arms 12 to remain in whatever position to which they are set.

Referring to FIG. 4, it can be seen that the main component of the hitch device 10 is the plate 24. This structure shown in FIG. 4 is of conventional design and includes an automatic coupling structure 26 also of well-known design. When the hitch mechanism 10 is to be connected to a pick-up truck bed, a plate 27 is secured to the bed 28 and further onto the frame (not shown) of the truck. The plate 27 has a laterally extending member 29 secured thereto and this laterally extending member 29 has upstanding portions 31 thereon with semi-circular cutout portions 30 on the top side thereof. The top members 32 also have a semi-circular cutout portion 30 which mates with the cutout portion 30 on the upstanding portion 31. The pins 21 are received through the cutouts 30 and is clearly shown in FIG. 5. These top members 32 are connected to the upstanding members 31 by means of the bolts 33 which are threadably received in bores 25 in the upstanding members 31.

In operation, when it is desired to connect a trailer 34 as shown in FIG. 1 to the tractor 11, the tractor would be backed up to the trailer 34 and adjacent the gooseneck tongue member 35 of the trailer 34 such that the pin 36 can be received in the slot in the plate 24 so that the locking mechanism 26 can function to securely hold the pin 36 with respect to the plate 24 and yet allow pivoting about the vertical axis of the pin 36 and pivoting about the horizontal axis of the pins 21. The projections 37 on the pin 36 serve to prevent the pin 36 from lifting out of the locking mechanism 26 and the lip 38 is present on the tongue member 35 to straighten out the plate 24 of the hitch mechanism 10 so that the pin 36 can be properly received through the slot in the plate 24 and consequently into the locking mechanism 26. Once this automatic locking is achieved, the jack stand 41 is removed and the tractor may tow the trailer 34 to wherever is desired.

The loop 39 is provided to allow a chain (not shown) to be removably snapped thereto, with the other end of the chain being within reach of a person positioned on the tractor seat. The chain could then be pulled when necessary to roughly align the plate 24 so that it can be automatically coupled to the pin 36. The lip 38 achieves the final alignment of the plate 24. The chain (not shown) is removed once the alignment and connection has been made.

When it is desired to use a truck to tow the trailer 34, then the portion of the hitch mechanism 10 as shown in FIG. 4 would be removed from the tractor be removal of the pin 17 and be sliding the draft arms 12 and the rigid supporting members 18 off of the pins 21. The portion of the hitch mechanism 10 shown in FIG. 4 would then be placed in the semi-circular grooves 30 of the upstanding portion 31 in the bed of the truck 28. The top cap members 32 would then be put into place and the bolts 33 rotated into engagement with the bores 25 in the upstanding portion 31. Once this has been done, then the trailer, as shown in FIG. 1, can be connected to the hitch mechanism 10 in a manner similar to that explained above with respect to the connection of the tractor thereto.

Obviously, many modifications and variations of the present invention are possible in light of the above teachings. It is therefore to be understood that, within the scope of the appended claims, the invention may be practiced otherwise than as specifically described.

I claim:

1. A coupling apparatus comprising:
   a plate means for supporting a substantial load on a top surface thereof;
   slot means formed in said plate means for reception of a coupling shaft of a trailer;
   locking means attached to said plate means and being disposed in said slot means for selectively locking said coupling shaft in said slot means;
   pin means attached to and extending from each side of said plate means;
   means for selectively journaling said pins to a prime mover, said journaling means comprising:
   two draft arms pivotally connected to said prime mover along a common axis at one end thereof and having an opening in the other end of each of said draft arms for reception of said pin means; and
   a rigid supporting means connected at one end to said pin means and at the other end to said prime mover at a point substantially above said common axis of the draft arms for vertically and laterally supporting said draft arms.

2. A coupling apparatus as defined in claim 1, wherein said journaling means further comprises a second rigid supporting means connected to said pin means at one end thereof and to said prime mover at the other end thereof for supporting said draft arms.

3. A coupling apparatus as defined in claim 2, wherein both of said rigid supporting means have a hole in said one end thereof and said pin means are received in said holes.

4. A coupling apparatus as defined in claim 3, wherein both of said rigid supporting means have secondary holes in the other end thereof and a pin extends through both of said secondary holes, said pin also extending through openings in a bracket attached to said prime mover.

5. A coupling apparatus as defined in claim 2, wherein both of said rigid supporting means include means for adjusting the length thereof.

6. A coupling apparatus as defined in claim 2 including means attached to said plate means rearwardly of said pin means for connecting a control chain to said plate for selectively pivoting the rear of said plate means upwardly.

* * * * *